United States Patent
Bunderson

(10) Patent No.: US 10,508,061 B2
(45) Date of Patent: Dec. 17, 2019

(54) SYNTHETIC AGRICULTURAL PRODUCT

(71) Applicant: BFP Management, LLC, Salt Lake City, UT (US)

(72) Inventor: Landon Bunderson, Salt Lake City, UT (US)

(73) Assignee: BFP Management, LLC, Salt Lake City, UT (US)

( * ) Notice: Subject to any disclaimer, the term of this patent is extended or adjusted under 35 U.S.C. 154(b) by 51 days.

(21) Appl. No.: 15/269,861

(22) Filed: Sep. 19, 2016

(65) Prior Publication Data

US 2017/0233303 A1    Aug. 17, 2017

Related U.S. Application Data

(60) Provisional application No. 62/220,603, filed on Sep. 18, 2015.

(51) Int. Cl.
| | | |
|---|---|---|
| *C05D 3/00* | (2006.01) | |
| *C05G 3/00* | (2006.01) | |
| *C05D 3/04* | (2006.01) | |
| *C05D 9/00* | (2006.01) | |

(52) U.S. Cl.
CPC .............. *C05G 3/0076* (2013.01); *C05D 3/00* (2013.01); *C05D 3/04* (2013.01); *C05D 9/00* (2013.01)

(58) Field of Classification Search
CPC ........... C05D 9/00; C05D 3/00; C05G 3/0076
See application file for complete search history.

(56) References Cited

U.S. PATENT DOCUMENTS

| | | |
|---|---|---|
| 3,160,495 A | 12/1964 | Smith et al. |
| 3,441,400 A | 4/1969 | Otrhalek |
| 4,273,570 A | 6/1981 | Deubler |

(Continued)

FOREIGN PATENT DOCUMENTS

| | | | | |
|---|---|---|---|---|
| CN | 104774093 A | 7/2015 | | |
| FR | 3009207 A1 * | 8/2013 | .............. | B01J 29/72 |

(Continued)

OTHER PUBLICATIONS

GSA Resources Inc. "Cation Exchange Capacity of Zeolites" pp. 1-3. Obtained Mar. 5, 2018.*

(Continued)

*Primary Examiner* — Jennifer A Smith
(74) *Attorney, Agent, or Firm* — Terrence J. Edwards; TechLaw Ventures, PLLC

(57) ABSTRACT

The disclosure relates generally to a synthetic agricultural product and methods and systems for producing a synthetic agricultural product or composition. The method of producing a synthetic agricultural product may comprise providing an effective amount of fertilizer and/or other agricultural product sufficient to effectuate a response in a plant, an effective amount of a mineral substance having a high cation exchange capacity, and an effective amount of water sufficient to effectuate a desired result in a plant. The fertilizer and/or other agricultural product and mineral substance may be added into the effective amount of water, thereby creating the synthetic agricultural product. Known ions, such as fertilizer ions, and native ions in the native mineral substance may be exchanged to produce a synthetic agricultural product.

25 Claims, 9 Drawing Sheets

(56) References Cited

U.S. PATENT DOCUMENTS

| | | | |
|---|---|---|---|
| 4,920,086 A * | 4/1990 | Raythatha | B01J 29/049 |
| | | | 501/148 |
| 5,695,542 A | 12/1997 | Chang | |
| 6,274,528 B1 * | 8/2001 | Labasque | B01D 53/02 |
| | | | 502/64 |
| 6,656,382 B1 | 12/2003 | Kuhlmann et al. | |
| 6,749,659 B1 | 6/2004 | Yu et al. | |
| 8,110,017 B2 | 2/2012 | Wells | |
| 9,133,066 B2 | 9/2015 | Jung et al. | |
| 9,334,200 B2 | 5/2016 | Kaiser, II | |
| 2004/0003636 A1 * | 1/2004 | Liao | C05B 7/00 |
| | | | 71/64.11 |
| 2006/0156772 A1 | 7/2006 | Karr et al. | |
| 2010/0139347 A1 * | 6/2010 | Barati | C05G 3/0047 |
| | | | 71/23 |
| 2011/0286799 A1 | 11/2011 | DelaGarza et al. | |
| 2014/0208815 A1 | 7/2014 | Kaiser | |
| 2015/0128671 A1 | 5/2015 | Ishizaka | |
| 2015/0266786 A1 | 9/2015 | Huang et al. | |
| 2015/0299060 A1 | 10/2015 | Okuya et al. | |
| 2016/0200634 A1 | 7/2016 | Zaseybida et al. | |
| 2016/0207844 A1 | 7/2016 | Stoller et al. | |

FOREIGN PATENT DOCUMENTS

| | | | | |
|---|---|---|---|---|
| WO | WO-2010001184 A1 * | 1/2010 | | C05D 3/02 |
| WO | 2015024672 A1 | 2/2015 | | |
| WO | 2015155585 A1 | 10/2015 | | |
| WO | 2016025109 A1 | 2/2016 | | |

OTHER PUBLICATIONS

Zhao, Yafei, et al. "Preparation of highly ordered cubic NaA zeolite from halloysite mineral for adsorption of ammonium ions." Journal of Hazardous Materials 178.1-3 (2010): 658-664.*

Ahmed, M.H.M (2014). Synthesis and Characterization of Hierarchical EU01 Zeolite and its Application in Converting Dimethyl Ether to Olefins (Graduate thesis).*

Leggo; 'An investigation of a plant growth in an organo-zeolite substrate and its ecological significance'; Plant and Soil vol. 219; pp. 135-146 (2000) Abstract; p. 136 col. 1 para 4-p. 137 col. 1 para 5.

Carroll; 'Ion exchange analysis in clays and other minerals'; Bull. Geol. Soc. Am. vol. 70 pp. 7409-780 (Jun. 1959) Abstract.

* cited by examiner

SYNTHETIC AGRICULTURAL PRODUCT

CROSS-REFERENCE TO RELATED APPLICATIONS

This application claims the benefit of U.S. Provisional Application No. 62/220,603, filed Sep. 18, 2015, which is hereby incorporated by reference herein in its entirety, including but not limited to those portions that specifically appear hereinafter, the incorporation by reference being made with the following exception: In the event that any portion of the above-referenced provisional application is inconsistent with this application, this application supersedes said above-referenced provisional application.

TECHNICAL FIELD

The disclosure relates generally to methods, systems and compositions relating to agricultural products, and more particularly, but not necessarily entirely, to a liquid synthetic agricultural product or composition and methods and systems for producing the liquid synthetic agricultural product or composition.

BACKGROUND

Current fertilization systems often struggle to deliver nutrition or other agricultural product directly to the plant cell. Accordingly, it is common in the farming or other plant growing industries to provide much more of the fertilizer composition and/or other agricultural products than is actually needed or used by the plant. Such practices may have negative impacts on the environment and ultimately increase the cost of farming and plants that are provided to the marketplace.

The features and advantages of the disclosure will be set forth in the description which follows, and in part will be apparent from the description, or may be learned by the practice of the disclosure without undue experimentation. The features and advantages of the disclosure may be realized and obtained by use of the instruments and combinations particularly pointed out in the appended claims, if any.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION OF THE DISCLOSURE

Figure 1A:
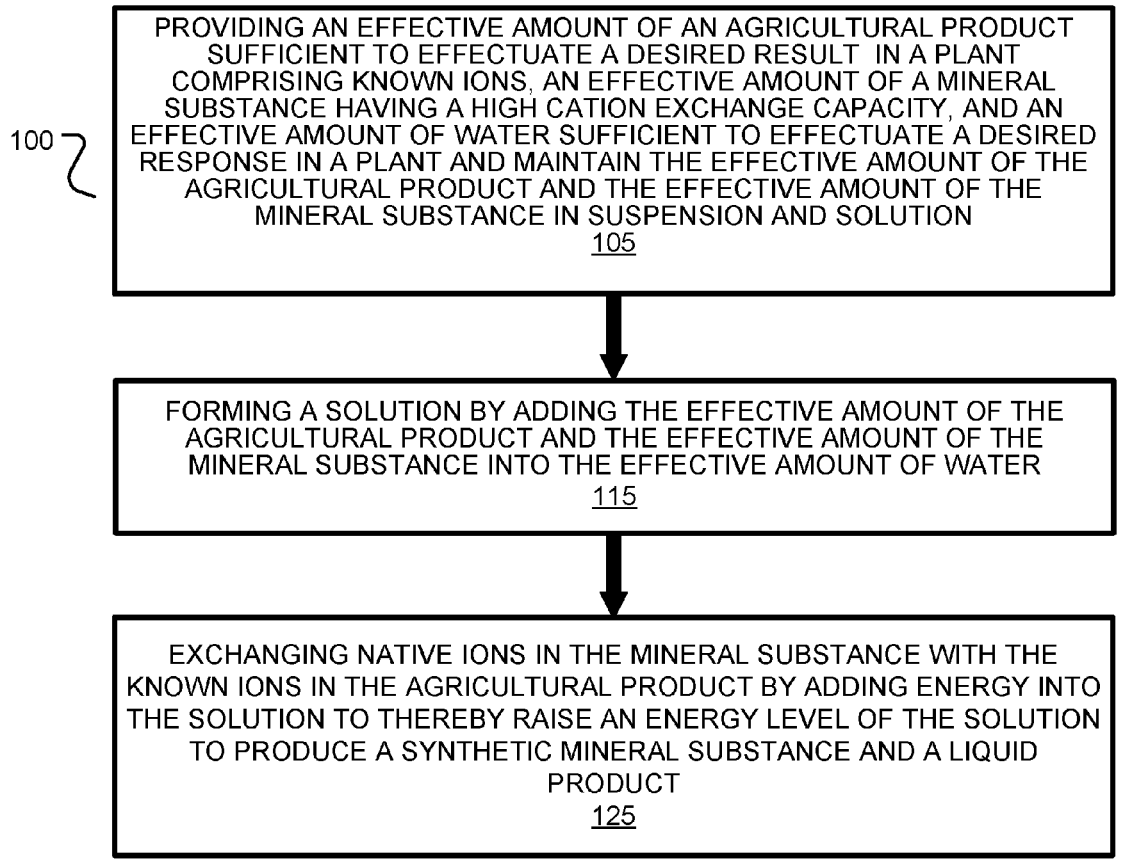
FIG. 1A is a flow chart of an implementation of a method of producing a liquid fertilizer and/or agricultural product in accordance with the teachings and principles of the disclosure.

For the purposes of promoting an understanding of the principles in accordance with the disclosure, reference will now be made to the implementations and embodiments illustrated in the drawings and specific language will be used to describe the same. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

Before the agricultural products, compositions and methods for suspending fertilizer and/or agricultural products in a solution are disclosed and described, it is to be understood that this disclosure is not limited to the particular configurations, process steps, ingredients and materials disclosed herein as such configurations, process steps, ingredients, and materials may vary somewhat. It is also to be understood that the terminology employed herein is used for the purpose of describing particular embodiments and implementations only and is not intended to be limiting since the scope of the disclosure will be limited only by the appended claims, if any, and equivalents thereof.

The publications and other reference materials referred to herein to describe the background of the disclosure, and to provide additional detail regarding its practice, are hereby incorporated by reference herein in their entireties, with the following exception: In the event that any portion of said reference materials is inconsistent with this application, this application supersedes said reference materials. The reference materials discussed herein are provided solely for their disclosure prior to the filing date of this application. Nothing herein is to be construed as a suggestion or admission that the inventors are not entitled to antedate such disclosure by virtue of prior disclosure, or to distinguish the disclosure from the subject matter disclosed in the reference materials.

In describing and claiming the subject matter of the disclosure, the following terminology will be used in accordance with the definitions set out below.

It must be noted that, as used in this specification and the appended claims, if any, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element, step, or ingredient not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

As used herein, the term "ultrapure water" is intended to mean water that has been purified such that it measures 18.3 mega ohms of resistance or less, and may include water having a designation to those skilled in the art of "ultrapure water." Pure water is intended to denote water that is relatively reactive (when compared to water having contaminants therein) with its surroundings due primarily to the polarized nature of water molecules. For example: it should be noted that, water, a tiny combination of three nuclei and ten electrons possesses special properties that make it unique among the more than 15 million chemical species we are presently aware of and essential to all life. A water molecule is electrically neutral, but the arrangement of the hydrogen atoms and the oxygen atom is such that a charge displacement is created thus constituting an electric dipole, or polar molecule, with one end (the end with the hydrogen atom) being positive and the other end (the end with the oxygen atom) being negative. Because, opposite charges attract, the negative end of one water molecule will tend to orient itself in a fashion that will bring it close to the positive end of another molecule that is nearby. Generally speaking, this dipole-dipole attraction is less than that of a normal chemical bond, and is dynamic in nature. Further, this attraction causes complex structures that are temporary in nature and thus always changing. The various structures can be influenced by other elements (contaminants) that can provide electrical balance for these structures, thereby stabilizing the structures and making a body of water less reactive.

Water is a unique compound that has many different chemical and physical properties. For example, water molecules may include any or all of the following bonding types. In water, a strong hydrogen bond is present with the OH covalent bond within the water molecule. A weak hydrogen bond is the bond between two water molecules. This weak hydrogen bond is also responsible for water bonding with ammonia, for example (thus ammonia's remarkably high solubility in water). Water also includes ionic attraction due to their positive and negative ions. By way of example, sodium ions and chlorine ions have an ionic attraction, which will form an ionic bond creating sodium chloride. Water also experiences permanent dipole moments; H2O, NH3, and PC13 are examples of molecules with a permanent dipole moment. Water may also include ion-dipole interactions. Sodium ions in water will create an ion-dipole interaction where the dipole will orient its' negative side towards the sodium (a positive ion). Chlorine ions conversely will create an ion-dipole interaction where the dipole will orient its' positive side towards the chlorine (a negative ion). Water may also experience dipole-dipole interactions. Dipoles will orient themselves with their negatively charged side towards the other's positively charged side. Water may also experience ion-induced dipole interactions. Nearby ions can distort electron clouds (even in dipoles) temporarily changing their dipole moments. This effect is particularly strong in larger ions such as SO22—this action can play a dominant role in compound formation. Water may also experience dipole-induced dipole interactions. Hydrocarbons, which are non-polar in nature, may create an example of a dipole (in this case water) creating a hydrate compound as the water dipole creates a temporary dipole out of the non-polar species (the hydrocarbons). Water may also experience dispersion (London force) interactions. These dipole independent forces are evidenced when we consider that nitrogen as N2 may be condensed to liquids or solids.

It will be understood that ultrapure water contains virtually no inorganic matter, such as cations, anions, solids, nor does it contain organic matter, such as carbon based material. The ASTM definition for ultrapure water, as it relates to resistivity, is shown below and this disclosure includes through type E-4:

| Parameter | Type E-1 | Type E-1.1 | Type E-1.2$^B$ | Type E-1.3$^B$ | Type E-2 | Type E-3 | Type E-4 |
|---|---|---|---|---|---|---|---|
| Resistivity, 25° C. | 18.3 | 18.2 | 18.2 | 18.2 | 16.5 | 12 | 0.5 |

Ultrapure water may be established using any known protocol, but one exemplary multi-stage process begins with: carbon filtration, softening, reverse osmosis, deionization, exposure to ultraviolet light or radiation, and sub-micron filtration.

As used herein, "nano particle" or "nano particle size" includes an average compound or element size having a diameter in any one dimension that is 100 nanometers or less. As used herein, "submicron particle" or "submicron particle size" includes an average compound or element size having a diameter in any one dimension that is within a range of about 101 nanometers to about 1000 nanometers.

As used herein, "effective amount" means an amount of a component of a fertilizer, an agricultural product, or other compound or element sufficient to provide nutrition to a plant, or sufficient to effectuate the desired response and performance, including killing a plant or undesirable organism, at a reasonable benefit/risk ratio attending any agricultural product, compound and/or composition. For example, an effective amount of a fertilizer compound is an amount sufficient to promote the optimal or desired maturation of plants. An effective amount of a phyllosilicate or tectosilicate or a mineral substance having a high ion exchange capacity is an amount sufficient to deliver an effective amount of fertilizer or other agricultural product through exchange of native ions on the mineral particles with known ions/molecules of an agricultural product such as fertilizer. Further, the effective amount of the phyllosilicate or tectosilicate or mineral substance must be sufficient to hold and deliver enough known ions and molecules in an agricultural product to result in promoting the optimal or desired maturation of plants. In an implementation, depending upon the desired ion of an agricultural product to be delivered to the plant cell, the amount of ions may be more than two orders of magnitude and up to, and including, seven orders of magnitude more than available ion exchange sites within the phyllosilicate or tectosilicate mineral substance. It will be appreciated that more or less known ions, such as fertilizer or other agricultural product, may be present without departing from the scope of the disclosure.

In order to determine the quantity of phyllosilicate or tectosilicate mineral substance, the amount of agricultural product desired in the plant is calculated first. The amount of phyllosilicate or tectosilicate or mineral substance is then determined based on the number of known ions of the agricultural product and the number of exchange sites on the mineral substance. As native ions are removed from the mineral substance (cation exchange), known ions in the solution can take the place of the removed native ions and the known ions in the solution may then be displaced in or otherwise delivered inside the plant. It will be appreciated that sometimes the native ions "on" the phyllosilicate or tectosilicate or mineral substance are tightly bound and can only be removed with a concentrated solution of known ions. In such cases, it is necessary to create a solution with at least two orders and up to seven orders of magnitude of known ions more than the available exchange sites in the mineral substance.

Referring now to FIG. 1A, there is illustrated a method of producing a liquid product. In an implementation, the method 100 may comprise at 105 providing an effective amount of an agricultural product sufficient to effectuate a desired result in a plant comprising known ions, an effective amount of a mineral substance having a high cation exchange capacity, and an effective amount of water sufficient to effectuate a desired result in a plant and maintain the effective amount of the agricultural product and the effective amount of the mineral substance in suspension and solution. Additionally, at 115, the method 100 may comprise creating or forming a solution by adding the effective amount of the agricultural product and the effective amount of the mineral substance into the effective amount of water. At 125, the method 100 may further comprise exchanging native ions in the mineral substance with the known ions in the agricultural product by adding energy into the solution to thereby raise an energy level of the solution to produce a synthetic mineral substance and a liquid product.

As used herein, the term "synthetic" includes "wholly synthetic" compounds, solutions, and substances and "partially synthetic" compounds, solutions, and substances. It will be appreciated that a wholly synthetic compound, solution or substance is entirely generated or synthesized in a laboratory, whereas a partially synthetic compound, solution or substance is chemically altered from its natural or native state. By way of example, a wholly synthetic mineral substance may be a crystalline structure that is generated or synthesized in a laboratory setting from non-crystalline molecules and ions. By way of further example, a partially synthetic mineral substance may be a crystalline structure that is a native mineral that has been chemically altered in a laboratory. It will be appreciated that the laboratory may be a mobile laboratory or a stationary factory or laboratory without departing from the scope of the disclosure.

Figure 1B:
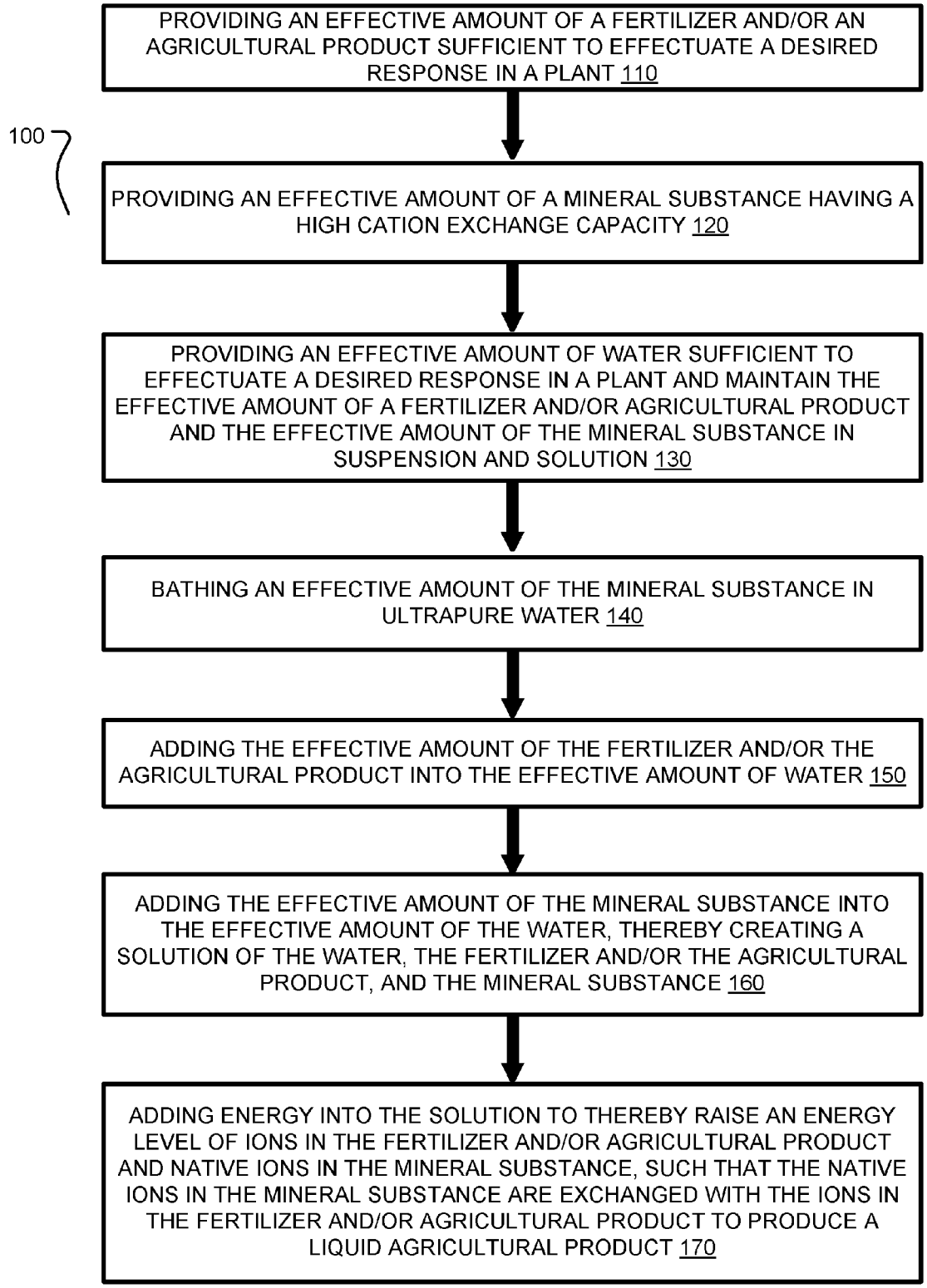
FIG. 1B is a flow chart of an implementation of a method of producing a liquid fertilizer and/or agricultural product in accordance with the teachings and principles of the disclosure.
Figure 1C:
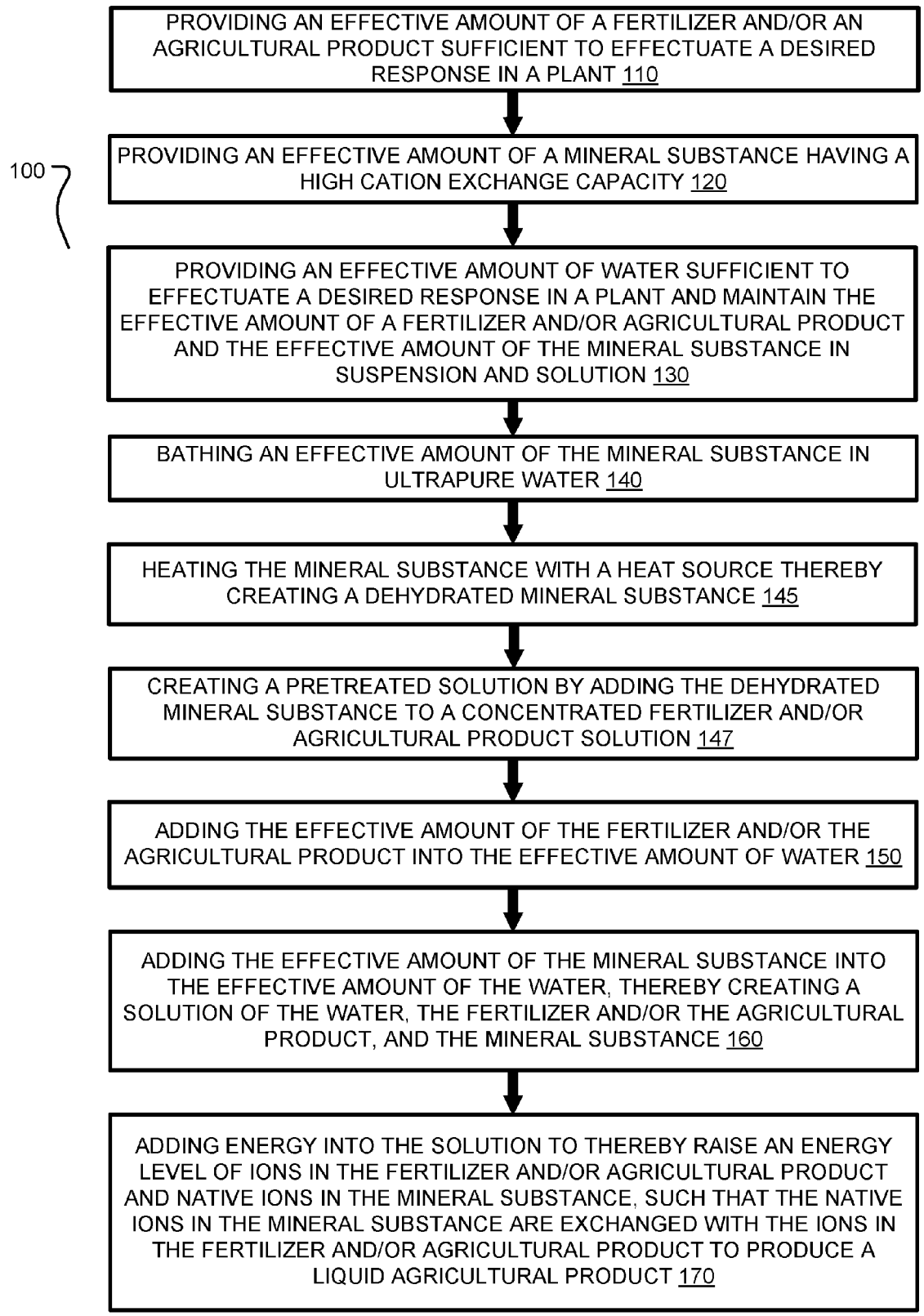
FIG. 1C is a flow chart of an implementation of a method of producing a liquid fertilizer and/or agricultural product in accordance with the teachings and principles of the disclosure.

Referring now to FIGS. 1B and 1C, there are illustrated methods of producing a liquid product, such as a liquid fertilizer and/or liquid agricultural product. In an implementation, the method 100 may comprise providing an effective amount of a fertilizer and/or an agricultural product sufficient to effectuate a response in a plant at 110. It will be appreciated that the fertilizer and/or agricultural product type used may be in a liquid or solid form, such as dry particles or dry matter that can be dissolved or suspended in water to form a solution or suspension without departing from the scope of the disclosure. It will further be appreciated that any fertilizer and/or agricultural product type, form, substance, compound or formulation may be utilized herein without departing from the scope of the disclosure.

As used herein the phrase "agricultural products" refers broadly to molecules, ions, compounds, solutions, and substances used to protect plants, such as pesticides, molecules, ions, compounds, solutions, and substances used to kill plants, such as herbicides, and molecules, ions, compounds, solutions, and substances used as plant growth regulators, such as those used to promote plant health, fruiting, growth, or those used to slow plant growth.

It will be understood that matching fertilizer and/or agricultural product type and application rates to satisfy a plant's need is an essential component of optimizing plant production. However, different plants in different soil environments, each having different soil types and pHs and other environmental factors, will require varying rates of the major fertilizer nutrients, which are nitrogen (N), phosphate (P2O5), and potassium (potash, K2O). Plants also require the secondary nutrients, Sulphur (S), Calcium (Ca), and Magnesium (Mg), though in lesser quantities than the primary nutrients. Micronutrients are also considered essential though they are needed in still lesser quantities. Micronutrients include Chlorine (Cl), Manganese (Mn), Iron (Fe), Zinc (Zn), Copper (Cu), Molybdenum (Mo), and Nickel (Ni). Another element that is not considered essential, but is beneficial is Silicon (Si). Thus, due to variations in soil types, soil test nutrient levels, and nutrient ranges of different plants, different fertilizers, agricultural products, and application rates may be required. Still further, the methods, compositions and agricultural products disclosed herein may further affect the application rates, such that less fertilizer and/or agricultural product may be used to effectuate a response in or delivery the desired result to a plant. In any case, to optimize plant production, a plant's need for nitrogen, phosphate, and potassium (sometimes abbreviated to N—P—K) nutrients along with the other essential and beneficial nutrients must be met without over application. Thus, it will be appreciated that the disclosure may utilize any of these nutrients in any number of possible blends of fertilizer and/or agricultural product types to give the correct N—P—K and other nutrient ratio for a given plant or plant. All of these essential and beneficial nutrients are typically in ionic form and can be exchanged with native ions on a mineral substance. It should also be understood that ions and molecules listed above along with other elements, ions, and molecules may be used to kill or limit growth in plant material or other organisms such as insects, bacteria, fungi, viruses and other organisms by altering the dosage such that it is toxic to those organisms. For example, Manganese levels of 25 to 200 ppm in citrus leaf tissues are considered adequate while levels above 1000 ppm may result in toxicity. In an implementation, the form of the fertilizer is a liquid fertilizer or combination of fertilizer and other beneficial molecules that promote plant health and growth in a liquid form. It will be understood that in an embodiment the effective amount of liquid fertilizer may fall within a range of about 0.10 gallons to about 250 gallons per 250 gallons of finished liquid product without departing from the scope of the disclosure. In an embodiment, for dry, water soluble products, the dry product may fall within a range of about 0.01 pounds to 1000 pounds per 250 gallons of finished liquid product.

In an implementation, the form of the fertilizer and/or agricultural product is a solid or dry fertilizer and/or agricultural product, or a combination of fertilizer, agricultural products, and/or other beneficial molecules that promote plant health and growth in a solid or dry form.

It will be appreciated that ion exchange (cation exchange or anion exchange) is a chemical process where ions are exchanged between two electrolytes or between an electrolyte solution and a complex. This process includes both cations (ions with a positive charge) and anions (ions with a negative charge). Ion exchangers (complexes) can include synthetic gel polymers or natural substances. It will be appreciated that the mineral substance of the disclosure is the complex. Ion exchange on a complex occurs when preexisting ions on a complex are released in exchange for the binding of ions that have a higher affinity for the complex. This process can be reversed by introducing a saturated solution of the lower affinity ions to the complex.

In an implementation, anions may be selectively removed from water by ion exchange because different anions have different affinities, such as shown in this equation form: $SO \rightarrow\rightarrow NO3 \rightarrow\rightarrow$, $Cl\rightarrow$, $HCO3\rightarrow$, $OH\rightarrow$, $F\rightarrow$. For cations the affinity hierarchy is: ($Pb^{++}>$, $Ca^{++}>$, $Mg^{++}>$, $Na^+>$, $Li^+>$, $H^+$).

Continuing to refer to FIGS. 1B and 1C, in an implementation, the method 100, at 120, may comprise providing an effective amount of a mineral substance that comprises a high cation exchange capacity. Cation exchange capacity may be determined by calculating a value that is an estimate of a substance's ability to attract, retain, and exchange cation elements. Cation exchange capacity is reported in milliequivalents (meq) per 100 grams of a substance, which may be a soil substance, mineral substance, or other inorganic matter (meq/100 g). A meq is the number of ions that total a specific quantity of electrical charges. For example, a meq of potassium ($K^+$) ions is approximately $6\times10^{20}$ positive charges; whereas with calcium a meq of Calcium ($Ca^{++}$) is also $6\times10^{20}$ positive charges, but only $3\times10^{20}$ ions because each calcium ion has two positive charges. Although the minerals discussed here have high cation exchange capacity values, they do have a level of anion exchange capacity as well and the anion exchange can be utilized in the same way as the cation exchange. The number of cations supplied by the fertilizer and/or agricultural product source should outnumber the number of cations occurring naturally on the mineral substance, such that the probability for the native ion being exchanged for a fertilizer and/or agricultural product cation is high and the probability of the original cation being reintroduced onto the mineral substance is extremely low. Since most fertilizers and/or agricultural products applied in an agricultural or horticultural setting are often a mixture of two or more primary, secondary, and micro nutrients, and that the combinations are many and varied, it is difficult to describe all of the possibilities, but the ions (both positive and negative) supplied by the fertilizer and/or agricultural product may be at least two orders and may be equal to or up to seven orders of magnitude more abundant than the ions available for exchange (both positive and negative) natively occurring on the mineral substance. Exception to this rule may be when the known ions in the fertilizer and/or agricultural product supplied have a single charge (especially positive ions) and have an extremely high affinity for the soil particle—in other words, once the known ions in the fertilizer and/or agricultural product are exchanged with the native mineral ions the negatively (for example) charged soil particle once ionically bound to the fertilizer and/or agricultural product cation (for example) would represent an extremely low energy state such that exchange is extremely unlikely.

It will be understood that cations held on the soil substance, mineral substance and inorganic matter particles in soil substances and mineral substances can be replaced by other cations. Thus, the ions in these soil substances, mineral substances, and inorganic matter are exchangeable. By way of example, iron can be replaced or exchanged by cations, such as calcium or potassium, and vice-versa. The total number of cations a soil substance, a mineral substance or other organic matter or substance can hold—or its total negative charge—is the cation exchange capacity. The higher the cation exchange capacity, the higher the negative charge and the more cations that can be held. High cation exchange capacity may be defined as 12 meq up to 600 meq.

It will be appreciated that the mineral substance may be in the consolidated or aggregate form. In an implementation, the mineral substance is a zeolite of the zeolite group in the tectosilicate family and can be naturally occurring or synthetically derived. Zeolites are crystalline, hydrated aluminosilicates that contain alkali and alkaline-earth metals. Their crystal framework is based upon a three-dimensional network of $SiO4$ tetrahedra with all four oxygens shared by an adjacent tetrahedral. The alkali and alkaline earth cations are loosely bound within this structure (by ionic bonding) and can be exchanged by other cations or molecular water. Most zeolites can be dehydrated and rehydrated without any change in volume. The important physical and chemical properties of zeolites are: high degree of hydration, low density and large void volume when dehydrated, cation exchange properties, uniform molecular-sized channels in the dehydrated crystals, ability to adsorb gases and vapors, and catalytic properties.

It will be appreciated that molecular sieves are materials that can selectively adsorb molecules on the basis of their size, shape, or electrical charge. Commercial applications of zeolites are based on the following properties: molecular sieving, ion exchange, adsorption, and catalysis. Most zeolites are molecular sieves, but not all molecular sieves are zeolites. Activated carbon, activated clays, aluminum oxide, and silica gels are also molecular sieves. Activated synthetic and natural zeolite molecular sieve products, however, have displaced many of these substances because of their selectivity.

It will be appreciated that the basic structure of zeolites comprise $(AlSi)O4$ tetrahedra, wherein each oxygen atom is shared by two tetrahedra: thus, the atomic ration $O:(Si+Al)$ is 2. The net negative charge of the structure is balanced by exchangeable cations, which are loosely held within the central cavities by weak ionic bonding and surrounded by water molecules. The cavities form a continuous network of channels that give this mineral the capabilities to adsorb water and other ionic solutions readily. The zeolite may comprise a hydrated sodium calcium aluminosilicate. Further, the mineral substance may be made up of frameworks of $AlO4$ and $SiO4$ tetrahedra, which have large interconnecting spaces known as channels. Channels are filled with water that can be removed through heating without affecting the aluminosilicate structures.

It will be appreciated that the dimensions and orientation void spaces and the interconnected channels in dehydrated zeolites are important determining the physical and chemical properties (see Figure of zeolite structure). The three types of channel systems identified, are a one-dimensional system, a two-dimensional system, and two varieties of three-dimensional, intersecting systems. It will be appreciated that once there has been an exchange of known ions (such as ions commonly found in fertilizers and/or agricultural products) with the native or unknown ions at the exchange sites of the mineral substance, a vortex, high-pressure, or a high pressure cyclonic mixing action may be used to fill the channels or voids in the mineral substance with known ions, such as fertilizers and/or agricultural products or other nutrients, to create a mineral substance with known ions exchanged at the exchange sites as well as filling, at least in part, the channels of the mineral substance through diffusion. Since the pre-existing ions in the native zeolite are part of the native chemical structure, exchanging those ions with new known ions results in a new and synthetic chemically altered formula that describes the makeup of the zeolite, and as such is considered partially synthetic. It will be understood that in some mineral substances, such as clay, there may not be any channels or voids where additional ion exchange can take place, but instead there may only be exchange sites. Conversely, in other mineral substances, such as zeolite, there may be both exchange sites and channels or voids where additional ion exchange can take place between the native ions in the mineral substance and the known ions in the fertilizer and/or agricultural product and/or other nutrient.

It will be appreciated that the character of the water in hydrated zeolite crystals varies, because it can include molecular clustering or direct bonding between the cations and the framework oxygen molecules. The inter-crystalline volume that may be occupied by water constitutes up to 50% of the volume of the crystal. The adsorption capacity of a zeolite is generally related to the free space or pore volume as determined by the quantity of contained water when fully hydrated at a standard temperature and humidity. Adsorption and ion-exchange capacities in both hydrated and dehydrated zeolites are related to the characteristics of the channel openings. The apertures are bounded by oxygen atoms of the connected tetrahedral. The limiting size of the aperture is governed by the size of the rings, which contain 6, 8, 10, or 12 oxygen atoms.

It will be appreciated that the chemical properties of zeolites make use of one or more of their chemical properties, which include adsorption, cation exchange, and dehydration or rehydration. These properties are functions of the specific crystal structure of each mineral, its framework, and its cationic composition.

It will be appreciated that crystalline zeolites are unique adsorbent materials. The large central cavities and entry channels (see Figure of generalized zeolite structure) of the zeolite are filled with water molecules that form hydration spheres around the exchangeable cations. If the water is removed, molecules having cross-sectional diameters small enough for them to pass through the entry channels are readily adsorbed in the channels and central cavities and can be held there until they are removed via diffusion. Molecules too large to pass through the entry channels are excluded, which result in the molecular sieving property of most zeolites.

It will be appreciated that exchangeable cations of a zeolite are loosely bonded to the tetrahedral frame work and can be easily exchanged and removed by washing with a strong solution of another cation. The meq/100 g or some zeolite minerals is between 200 meq/100 g and 500 meg/100 g. Crystalline zeolites are very effective ion exchangers. The ion-exchange capacity is basically a function of the degree of substitution of aluminum for silicon in the framework structure. The greater the substitution, the greater the charge deficiency, and the greater the number of alkali or alkaline earth cations required for electrical neutrality. Cation exchange behavior also depends on other factors, including: the concentration of the specific cation in the solution; the temperature; the nature of the cation species (e.g., size, charge); and the structural characteristics of the particular zeolite. Cations can be trapped in structural positions that are relatively inaccessible, thereby reducing the effective ion-exchange capacity. Cation sieving may also take place if the cation in solution is too large to pass through the entry ports into the central cavities. Unlike most non-crystalline ion exchangers, the framework of a zeolite defines its selectivity toward competing ions, and different structures offer different sites for the same cation. The hydration strength of some ions prevents their close approach to the seat of charge within the framework. In many zeolites, ions having low field strength are more tightly held and are more selectively taken up from solutions than the other ions.

It will be appreciated that zeolites exhibit no major changes during dehydration; they do exhibit continuous weight loss as a function of temperature and will rehydrate. If the temperature required for complete dehydration is exceeded, the zeolite structure collapses and rehydration cannot occur. Most natural zeolites are thermally stable from 250° C. to 400° C. (482° F. to 752° F.). Zeolites with higher silica contents, such as mordenite and clinoptiloloite, collapse at temperatures greater than 650° C. (1,202° F.).

It will be appreciated that clay minerals form flat hexagonal sheets similar to the mica group. Clay minerals may be hydrous aluminum phyllosilicates, sometimes with variable amounts of iron, magnesium, alkali metals, alkaline earths, and other cations. Clay minerals are common in fine-grained sedimentary rocks such as shale, mudstone, and siltstone and in fine-grained metamorphic slate and phyllite. Clay minerals are usually (but not necessarily) ultrafine-grained (normally considered to be less than 2 micrometers in size on standard particle size classifications) and so may require special analytical techniques for their identification and study. These include x-ray diffraction, electron diffraction methods, various spectroscopic methods such as Mössbauer spectroscopy, infrared spectroscopy, Raman spectroscopy, and SEM-EDS or automated mineralogy processes. These methods can be augmented by polarized light microscopy, a traditional technique establishing fundamental occurrences or petrologic relationships.

Clay minerals may be classified as 1:1 or 2:1, because they are built of tetrahedral silicate sheets and octahedral hydroxide sheets. A 1:1 clay would consist of one tetrahedral sheet and one octahedral sheet, and examples would be kaolinite and serpentine. A 2:1 clay would consist of an octahedral sheet sandwiched between two tetrahedral sheets, and examples are talc, vermiculite and montmorillonite.

Clay minerals may include the following groups. 1) The Kaolin group includes the minerals kaolinite, dickite, halloysite, and nacrite (polymorphs of Al2Si2O5(OH)4). Some sources include the kaolinite-serpentine group due to structural similarities. 2) The Smectite group includes dioctahedral smectites, such as montmorillonite and nontronite, and trioctahedral smectites, for example saponite. 3) The Illite group includes the clay-micas. Illite is the only common mineral. 4) The Chlorite group includes a wide variety of similar minerals with considerable chemical variation. Other 2:1 clay types exist such as, for example, sepiolite or attapulgite, are clays with long water channels internal to their structure.

It will be appreciated that mixed layer clay variations exist for most of the above groups. Ordering is described as random or regular ordering, and is further described by the range or reach. Such order descriptions may include an R1 ordered illite-smectite, for example. This clay type would be ordered in an ISISIS fashion. R0, on the other hand, may include or describe random ordering. Other advanced ordering types may also be found, such as R3, etc. Mixed layer clay minerals, which are perfect R1 types often get their own names. For example, R1 ordered chlorite-smectite is known as corrensite, and R1 illite-smectite is known as rectorite.

In an implementation, the mineral substance may comprise one or more of alumina silicate, silicate, aluminum, sodium aluminosilicate or other tuff material. In an implementation, the mineral substance comprises one or more of montmorillonite, illite, kaolinite, smectite, zeolite, hydrated sodium calcium aluminosilicate (HSCAS), and vermiculite. In an implementation, the mineral substance comprises smectite. In an implementation, the mineral substance comprises zeolite. In an implementation, the zeolite mineral substance is a carrier of nutrients and other small organic and inorganic molecules via ion exchange and adsorption inside the channels (formed by the crystalline structure). Zeolite channels may carry ions and small molecules used to protect plants, kill plants, or used as plant growth regulators, such as those used to promote plant health, fruiting, growth, or those used to slow plant growth for use by a cell.

In an implementation, the mineral substance having a high cation exchange capacity has an equivalents in a range of about 12 Milliequivalents/100 g to about 600 Milliequivalents/100 g.

The concentration of mineral particles in solution is within a range of $1 \times 10^{-8}$ mg/ml to $1 \times 10^{4}$ mg/ml. The concentration of agricultural product ions ranges from 0.01 mg/ml to saturation point.

Continuing to refer to FIGS. 1B and 1C, it will be appreciated that the method 100 may further comprise providing an effective amount of water sufficient to effectuate a desired result in a plant and maintain the effective amount of a fertilizer and/or agricultural product and the effective amount of the mineral substance in suspension and solution at 130. The effective amount of water may fall within a range of about 0.1 gallon to about 6000 gallons.

The method 100 may further comprise bathing an effective amount of the mineral substance in ultrapure water at 140. In an implementation of the method, the step of bathing the effective amount of the mineral substance in ultrapure water comprises bathing the mineral substance for at least 24 hours. The process of bathing the mineral substance may assist in preparing the mineral substance by removing native ions and molecules held by water in the channels through diffusion. Ultrapure water may be used to make the ions in the soil substance, mineral substance, or other organic material readily available for exchange. Thus, when the soil substance, mineral substance, or other organic material is bathed in ultrapure water, the ions in the mineral substance are exposed or otherwise made readily available for ion exchange with another known substance. Thus, in an implementation, the method and system of the disclosure may comprise exchanging cations from the mineral substance with selected cations of a known source. For example, in an embodiment, the method 100 comprises bathing an effective amount of the soil substance, the mineral substance or other inorganic material directly in the fertilizer or other agricultural product. When the soil substance, mineral substance, or other organic material is bathed in fertilizer or other known or desired source of ions, the ions in the soil substance, mineral substance, or other organic material are exposed or otherwise made readily available for ion exchange with another known substance.

The method 100 shown in FIG. 1B, may further comprise heating the mineral substance (zeolite) with a heat source, such that the water held by the mineral removed at 145 thereby creating a dehydrated mineral substance. In an implementation the heat source is an oven. In an implementation the heat source is a heat lamp. This step ensures that the zeolite channels are filled with a concentrated fertilizer and/or other agricultural product solution.

The method 100 shown in FIG. 1B may further comprise creating a pretreated solution by adding the dehydrated mineral substance to a concentrated fertilizer and/or other agricultural product solution at 147, thus introducing a high concentration of desired ions into the channels and at the ion exchange sites.

Continuing to refer to FIGS. 1B and 1C, at 150 and 160, respectively, the method 100 may comprise adding the effective amount of the fertilizer and/or other agricultural product into the effective amount of water; and adding the effective amount of the pretreated mineral solution into the effective amount of the water, thereby creating a solution of the water, the fertilizer and/or other agricultural product, and the mineral substance.

At 170, the method 100 may comprise adding energy into the solution to thereby raise an energy level of known ions in the fertilizer and/or other agricultural product and native ions in the mineral substance, such that the native ions in the mineral substance are exchanged with the known ions to produce a chemically altered and synthetic zeolite and a homogenous mixture of liquid fertilizer and/or other agricultural product. It will be appreciated that mechanical energy, chemical energy, electromagnetic energy, or other forms of energy may be added to the method, system or product of the disclosure without departing from the scope of the disclosure. In an implementation, energy may be added into the method, system or product of the disclosure through high-pressure or through a high pressure cyclonic mixing action. In an implementation, energy may be added into the solution by mixing the fertilizer and/or other agricultural product, water and mineral substance using the high pressure cyclonic mixing action.

In an implementation of the method, the method 100 may further comprise providing an effective amount of ultrapure water sufficient to effectuate a desired result in a plant and maintain the effective amount of liquid fertilizer and/or other agricultural product and the effective amount of the mineral substance in suspension and solution. In an implementation of the method, the method 100 may further comprise providing an effective amount of double distilled water sufficient to effectuate a desired result in a plant and maintain the effective amount of liquid fertilizer and/or other agricultural product and the effective amount of the mineral substance in suspension and solution. In an implementation of the method, the method 100 may further comprise providing an effective amount of untreated water sufficient to effectuate a desired result in a plant and maintain the effective amount of liquid fertilizer and/or other agricultural product and the effective amount of the mineral substance in suspension and solution. In an implementation of the method, the method 100 may further comprise providing an effective amount of potable water sufficient to effectuate a desired result in a plant to a plant and maintain the effective amount of liquid fertilizer and/or other agricultural product and the effective amount of the mineral substance in suspension and solution.

In an implementation, a method may add to a 200 gallon mixing tank the following: about 10-20 gallons water; about 1 gallon of liquid fertilizer and/or other agricultural product; and about 100 mL of a solution of mineral substance, which has been processed by being bathed and soaked in ultrapure water. It will be appreciated that such a bath and soak may be for at least 24 hours because the ultrapure water is hydrating the minerals within the mineral substance. It will be appreciated that, in an embodiment, there are about 7 grams of mineral substance in the 100 mL solution of the mineral substance. Thereafter, the 200 gallon tank may be filled with water (which may be any type of water, such as ultrapure water, double distilled water, untreated water, potable water and the like). There is an ion exchange that occurs between known ions with ions in the mineral substance. The method adds high energy mixing such that there is more opportunity for the ions to exchange with each other during the process, such that all or nearly all cations on the mineral particles are exchanged that are available for such an exchange.

Figure 2:
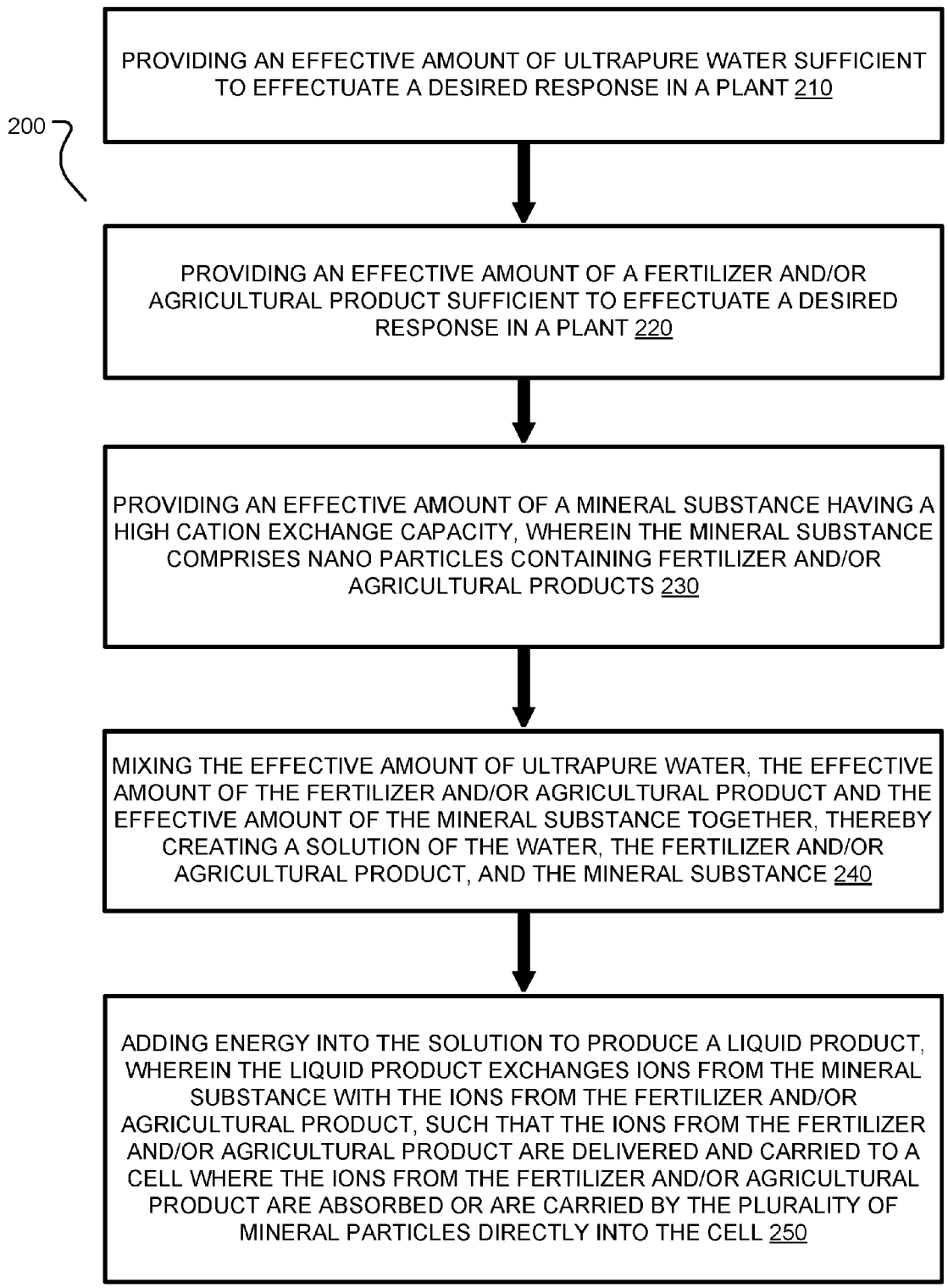
FIG. 2 is flow chart of an implementation of a method of producing a liquid fertilizer and/or agricultural product in accordance with the teachings and principles of the disclosure.

Referring now to FIG. 2, there is illustrated a method of producing a liquid fertilizer product and/or other agricultural product. In an implementation, the method 200 may comprise providing an effective amount of ultrapure water sufficient to effectuate a desired result in a plant at 210. In an implementation, the method 200 may comprise providing an effective amount of a fertilizer and/or other agricultural product sufficient to effectuate a response in the plant, wherein the fertilizer and/or other agricultural product comprises processed elements at 220. At 230, the method 200 may comprise providing an effective amount of a mineral substance having a high cation exchange capacity and comprising a plurality of particles of the mineral substance.

In an implementation, the method 200 may further comprise mixing the effective amount of ultrapure water, the effective amount of the fertilizer and/or other agricultural product and the effective amount of the mineral substance together, thereby creating a solution of the water, the fertilizer and/or other agricultural product and the mineral substance at 240. At 250, the method 200 may further comprise adding energy into the solution to produce a homogenous mixture of a liquid fertilizer product, wherein the liquid fertilizer product and/or other agricultural product exchanges ions from the mineral substance with the ions from the fertilizer and/or other agricultural product, such that the ions from the fertilizer and/or other agricultural product are delivered and carried to a cell where the ions from the fertilizer and/or other agricultural product are absorbed by the plant or are carried by the plurality of mineral particles directly into the cell.

Figure 3:
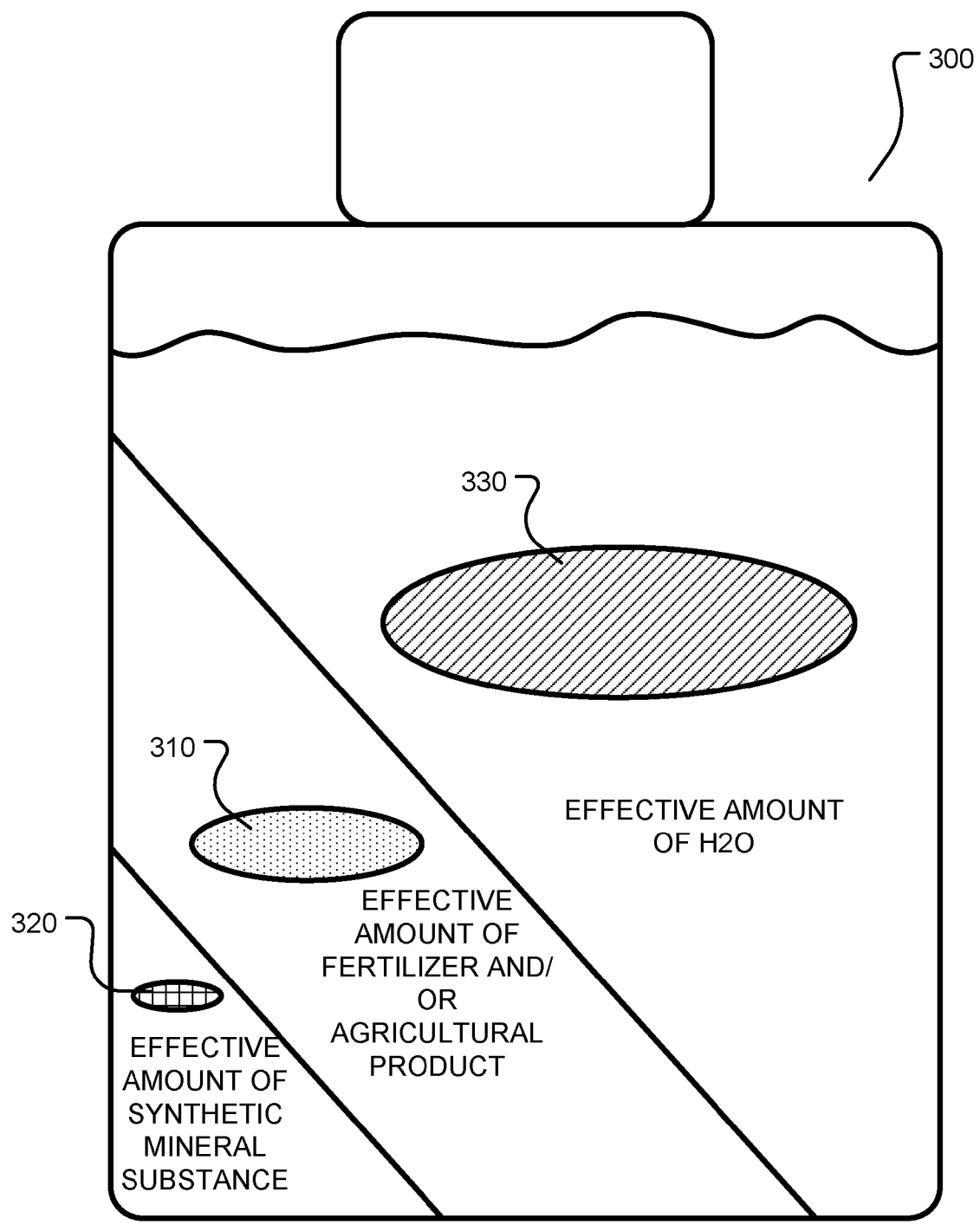
FIG. 3 is a drawing of a synthetic agricultural product made in accordance with the teachings and principles of the disclosure.

Referring now to FIG. 3, there is illustrated a synthetic agricultural product. The synthetic agricultural product 300 may comprise an effective amount of a fertilizer and/or other agricultural product 310 sufficient to effectuate a response in a plant. The synthetic agricultural product may comprise an effective amount of a synthetic mineral substance 320 having a high cation exchange capacity. It will be appreciated that the effective amount of the synthetic mineral substance 320 may be processed by being bathed in ultrapure water prior to being included as part of the product 300. The effective amount of the synthetic mineral substance 320 may be further processed such that the resulting synthetic mineral substance 320 comprises mineral particles having a particle size within a range of about 1 nanometer to about 1000 nanometers or 1 micrometer. An effective amount of water 330 sufficient to effectuate a desired result in a plant and maintain the effective amount of the fertilizer and/or other agricultural product and the effective amount of the synthetic mineral substance in suspension and solution. It will be appreciated that the effective amount of the fertilizer and/or other agricultural product 310 and the effective amount of the synthetic mineral substance 320 may be added into the effective amount of water 330, thereby creating the synthetic agricultural product 300. Thus, the synthetic agricultural product comprises the water 330, the fertilizer and/or other agricultural product 310, and the synthetic mineral substance 320. It will be appreciated that prior to being added into the product 300, energy may be added into the fertilizer and/or other agricultural product 310 and the mineral substance 320 to thereby raise an energy level of the solution, such that the native ions in the synthetic mineral substance 320 are exchanged with the known ions in the fertilizer and/or other agricultural product 310 to produce a homogenous mixture of the synthetic agricultural product 300.

In an implementation, the water 330 of the synthetic agricultural product 300 may be ultrapure water. In an implementation, the synthetic mineral substance 320 is bathed in ultrapure water for at least 24 hours. In an implementation, the water 330 of the synthetic agricultural product 300 may be double distilled water. In an implementation, the water 330 of the synthetic agricultural product 300 may be untreated water. In an implementation, the water 330 of the synthetic agricultural product 300 may be potable water.

In an implementation, there are at least two orders of magnitude difference in volume between the effective amount of the fertilizer and/or other agricultural product 310 and the effective amount of the synthetic mineral substance 320 when the ratio of mineral particle solution is 7 g to 100 ml. More generally, the number of ions from the fertilizer and/or other agricultural product should be two to seven orders of magnitude higher than the number of sites available for exchange in the mineral particles. In an implementation, the synthetic mineral substance 320 has a high cation exchange capacity and has an equivalents in a range of about 10 Milliequivalents/100 g to about 600 Milliequivalents/100 g.

In an implementation, the effective amount of water 330 falls within a range of about 0.1 gallon to about 6000 gallons.

In an implementation, the effective amount of the fertilizer and/or other agricultural product 310 is a liquid fertilizer and/or liquid agricultural product or a combination of fertilizer and/or other agricultural product and other beneficial molecules that promote plant health and growth. In an implementation, the effective amount of liquid fertilizer and/or other agricultural product falls within a range of about 0.10 gallons to about 50 gallons. In an implementation, the fertilizer and/or other agricultural product 310 comprises nanoparticles of the fertilizer.

In an implementation, the effective amount of the mineral substance 320 falls within a range of about 5 grams to about 2 kilograms. In an implementation, the synthetic mineral substance 320 comprises alumina silicate, silicate, aluminum, or sodium aluminosilicate. In an implementation, the synthetic mineral substance 320 comprises montmorillonite, illite, kaolinite, smectite and zeolite. In an implementation, the synthetic mineral substance 320 comprises smectite. In an implementation, the synthetic mineral substance 320 comprises zeolite. In an implementation, the synthetic mineral substance 320 is a carrier of nutrients and other small organic molecules used to protect plants, kill plants, or used as plant growth regulators, such as those used to promote plant health, fruiting, growth, or those used to slow plant growth for use by a cell. In an implementation, the synthetic mineral substance 320 comprises both phyllosilicate and tectosilicate. In an implementation, the synthetic mineral substance 320 comprises a mineral that has the ability to catalyze or cause or accelerate a reaction by acting as a catalyst.

In an implementation, the synthetic agricultural product 300 further comprises cations from a known source that have been exchanged with the cations of the synthetic mineral substance 320. In an implementation, the concentration of mineral particles in solution is within a range of $1 \times 10^{-8}$ mg/ml to $1 \times 10^4$ mg/ml. The concentration of agricultural product ions ranges from 0.01 mg/ml to saturation point.

In an implementation, energy is added into the synthetic agricultural product 300 by mixing the fertilizer and/or other agricultural product 310, water 330 and synthetic mineral substance 320 using a vortex, high-pressure, or a high pressure cyclonic mixing action.

Figure 4:
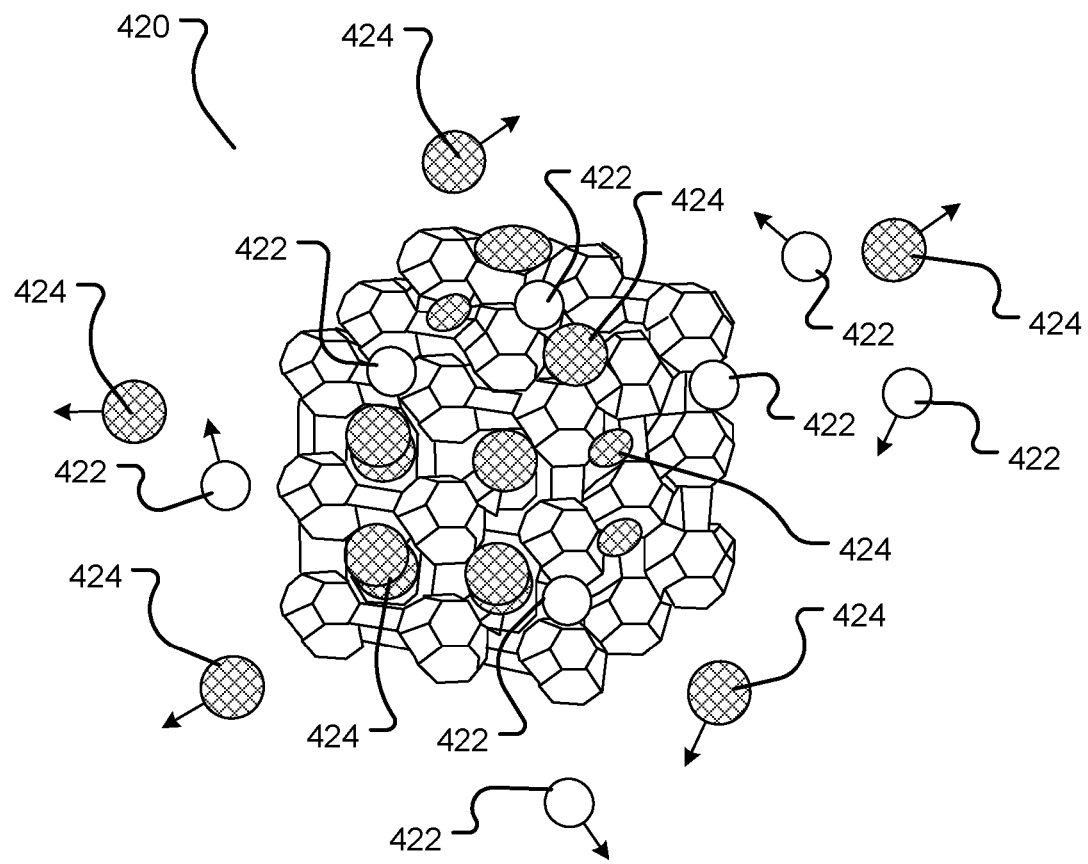
FIG. 4 illustrates an example of a synthetic mineral substance in accordance with the teachings and principles of the disclosure.

Referring to FIG. 4, there is illustrated an example of a synthetic mineral substance 420. It will be appreciated that the mineral substance 420 illustrated has been processed by exchanging native ions 422 with ions of another substance 424. The synthetic mineral substance 420 may be clay, zeolite, or other mineral substance, which may be utilized by the disclosure. In an implementation, the synthetic mineral substance 420 may be processed or synthesized by exchanging native ions 422 with known ions 424 of another substance, such as a fertilizer and/or other agricultural product, including substances that induce growth of a plant, substances that slow or limit the growth of a plant, or substances that kill or are otherwise harmful to a plant.

Figure 5:
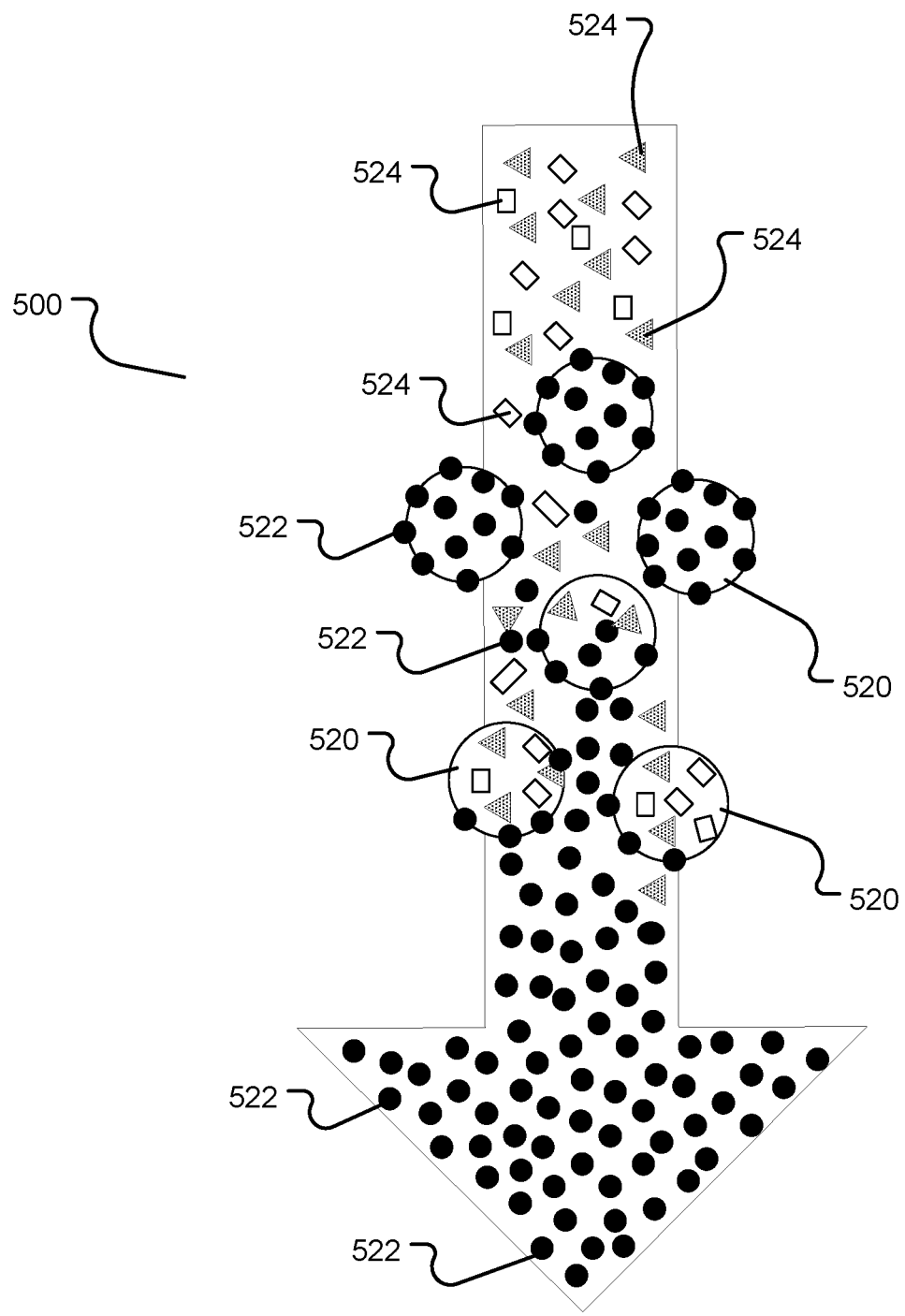
FIG. 5 is a diagram illustrating an ion exchange process in accordance with the teachings and principles of the disclosure.
Figure 6:
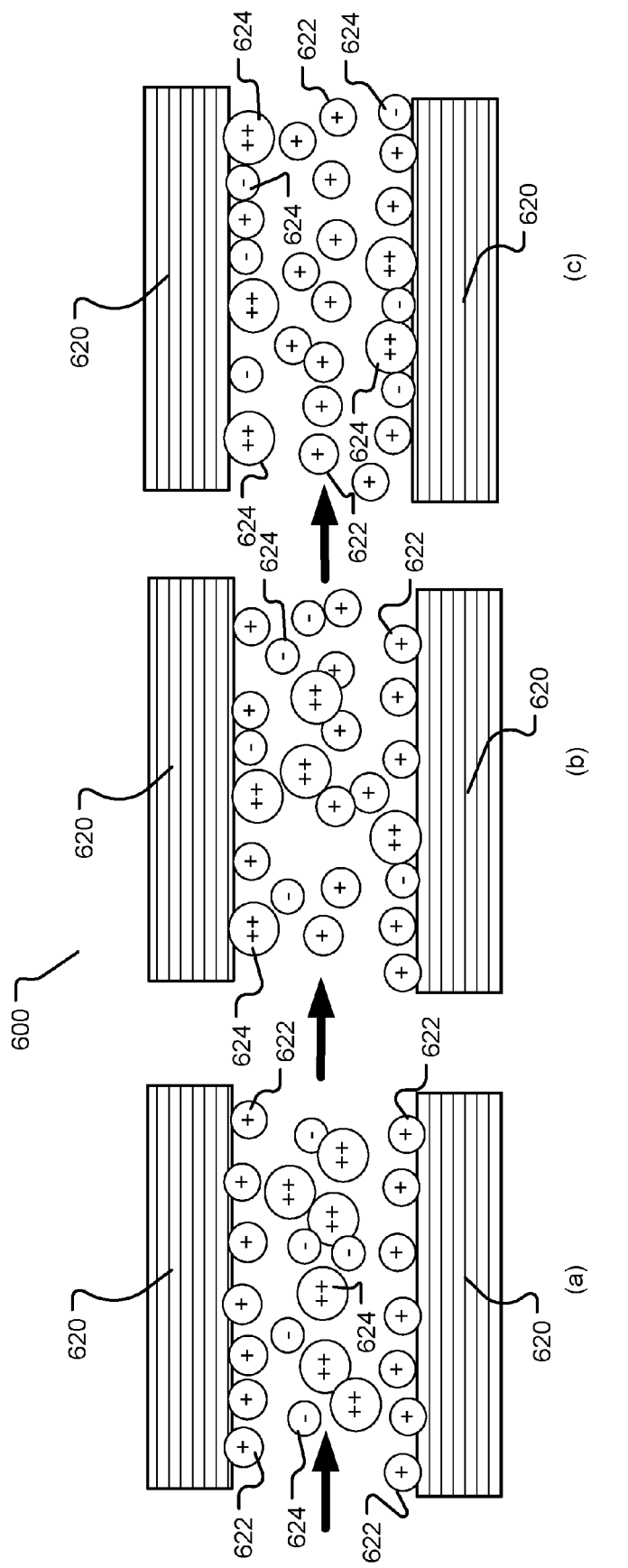
FIG. 6 is a diagram illustrating an ion exchange process in accordance with the teachings and principles of the disclosure.

FIGS. 5 and 6 are diagrams schematically illustrate ion exchange processes 500 and 600, respectively, which result in a synthetic mineral substance in accordance with the teachings and principles of the disclosure. As illustrated in FIG. 5 for example, a mineral substance 520 comprises native or naturally occurring ions 522 as noted above. The mineral substance 520 may be processed or synthesized by exchanging native ions 522 with ions 524 of a known substance, such as a fertilizer and/or other agricultural product. It will be appreciated that the ions 524 of the known substance may be introduced to the mineral substance 520 through the methods discussed more fully herein. During the process 500, the native ions 522 are exchanged with the ions 524 of the known substance until the synthetic mineral substance 520 now has more ions 524 of the known substance than native ions 522.

FIG. 6 illustrates the ion exchange process 600, wherein the mineral substance 620 is illustrated as a clay material with native ions 622 thereon that are available for exchange with ions 624 of a known substance. It will be appreciated that the clay material is shown for illustration purposes only. It will be appreciated that other mineral substances 620 may be used besides a clay material for providing an ion exchange between native ions and known ions without departing from the scope of the disclosure. The native ions 622 are illustrated as cations having a single positive charge (e.g., Na+), whereas the ions 624 of the known substance are illustrated as cations having two positive charges (e.g., Ca2+) and anions having a single negative charge (e.g., Cl−), which are shown for illustration purposes only. It will be appreciated that there are any number of cations or anions that may be exchanged without departing from the scope of the disclosure. The process 600 is illustrated in a time lapse from (a) to (c) for purposes of illustration and clarity. It will be appreciated that the actual amount of time and the amount of ions needed for a full process or exchange may be determined based on the teachings and principles of the disclosure.

Figure 7:
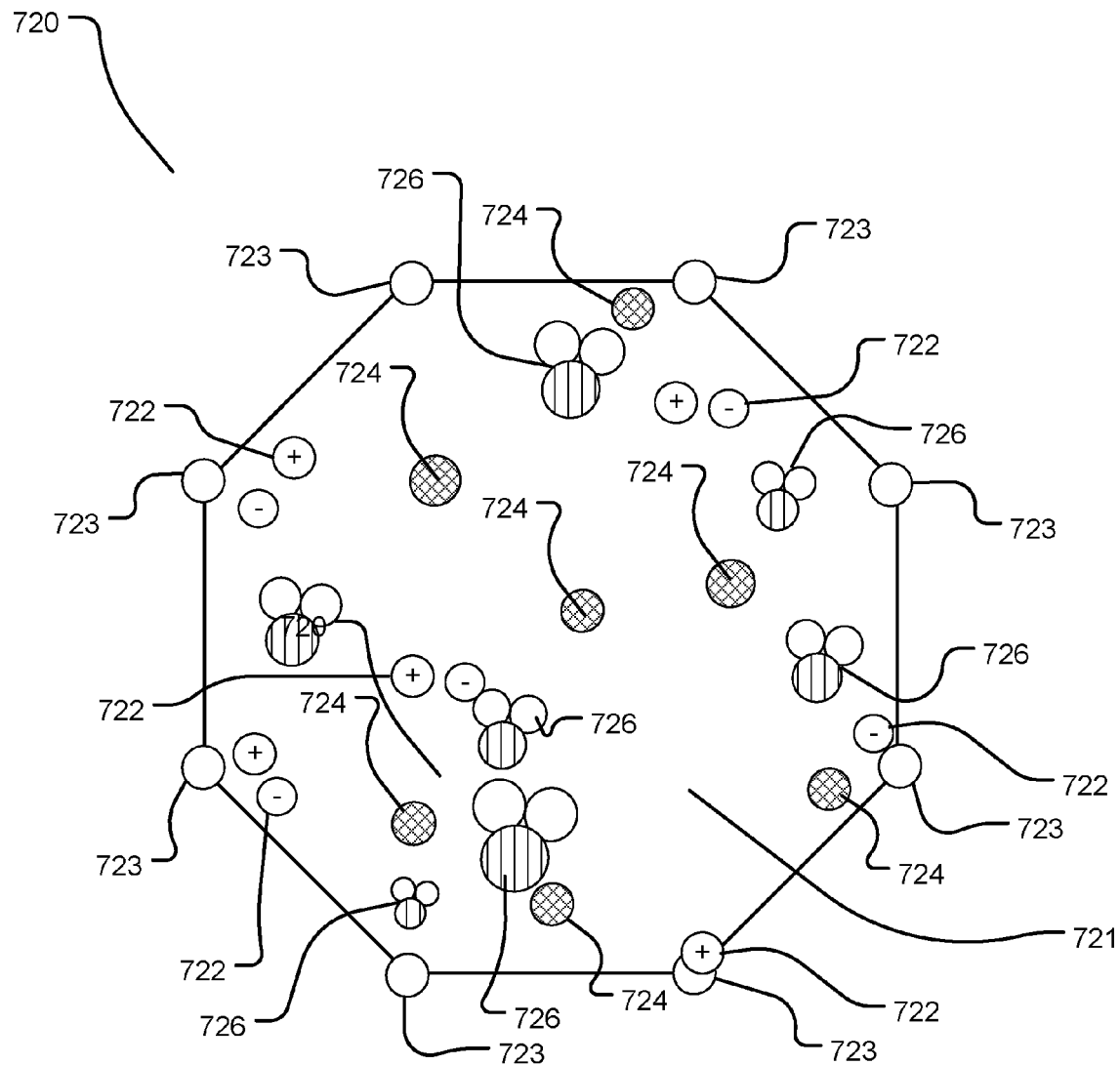
FIG. 7 illustrates an example of a synthetic mineral substance comprising agricultural product within exchange sites of the mineral substance in accordance with the teachings and principles of the disclosure.

FIG. 7 is a cross-sectional view illustrating an embodiment of a synthetic mineral substance 720 comprising ions 724 from an agricultural product that have been or are in the process of being exchanged with native ions 722 at exchange sites 723 of the mineral substance 720 in accordance with the teachings and principles of the disclosure. The synthetic mineral substance illustrated also comprises a plurality of channels 721, although only a single channel 721 in cross-section is illustrated. It will be appreciated that a high pressure mixing action, such as a vortex, may be used to at least partially fill the plurality of channels with the known ions 724 and/or other agricultural products. It will be appreciated that ions and molecules can be carried in solution inside the channel 721 without being attached at any time to the exchange sites 723. As illustrated, there are a plurality of exchange sites 723 present within the mineral substance 720. The mineral substance 720 is illustrated with native ions 722 (illustrated as both cations and anions, although it will be appreciated that native cations, anions or a combination may be exchanged with ions from a known source or substance) that are available for exchange with ions 724 of a known substance, such as ions within an agricultural product. It will be appreciated that there are any number of cations or anions that may be exchanged without departing from the scope of the disclosure. Also illustrated are water molecules 726 that are part of the solution carried through the channel 721.

EXAMPLES

Example 1 is a method of producing a liquid product. In the method, the method may comprise providing an effective amount of an agricultural product sufficient to effectuate a desired result in a plant comprising known ions; providing an effective amount of a mineral substance having a high cation exchange capacity; and providing an effective amount of water sufficient to effectuate a desired result in a plant and maintain the effective amount of the agricultural product and the effective amount of the mineral substance in suspension and solution. Additionally, the method may comprise forming a solution by adding the effective amount of the agricultural product and the effective amount of the mineral substance into the effective amount of water. The method may further comprise exchanging native ions in the mineral substance with the known ions in the agricultural product by adding energy into the solution to thereby raise an energy level of the solution to produce a synthetic mineral substance and a liquid product.

In Example 2, wherein providing an effective amount of water in Example 1 comprises providing an effective amount of ultrapure water.

In Example 3, wherein providing an effective amount of water in Example 1 comprises providing an effective amount of double distilled water.

In Example 4, wherein providing an effective amount of water in Example 1 comprises providing an effective amount of untreated water.

In Example 5, wherein providing an effective amount of water in Example 1 comprises providing an effective amount of potable water.

In Example 6, the method of Example 1, wherein there are at least two orders of magnitude difference between ions in the effective amount of the agricultural product and ion exchange sites in the effective amount of the mineral substance.

In Example 7, the mineral substance as in any of Examples 1-6 has a high cation exchange capacity and has an equivalents in a range of about 10 Milliequivalents/100 g to about 600 Milliequivalents/100 g.

In Example 8, the effective amount of water as in any of Examples 1-7 falls within a range of about 0.1 gallon to about 6000 gallons.

In Example 9, the agricultural product as in any of Examples 1-8 is a liquid fertilizer or a combination of fertilizer and other beneficial molecules that promote plant health and growth.

In Example 10, the effective amount of liquid fertilizer as in any of Examples 1-9 falls within a range of about 0.10 gallons to about 50 gallons.

In Example 11, the mineral substance as in any of Examples 1-10 falls within a range of about 5 micrograms to about 2 kilograms.

In Example 12, the mineral substance as in any of Examples 1-11 has a high cation exchange capacity and comprises alumina silicate, silicate, aluminum, sodium aluminosilicate, hydrated sodium calcium aluminosilicate, or other tuff material.

In Example 13, the mineral substance as in any of Examples 1-12 comprises montmorillonite, illite, kaolinite, smectite and zeolite.

In Example 14, the mineral substance as in any of Examples 1-13 comprises smectite.

In Example 15, the mineral substance as in any of Examples 1-13 comprises zeolite.

In Example 16, the mineral substance as in any of Examples 1-15 is a carrier of nutrients and small organic molecules used to protect plants, kill plants, or used as plant growth regulators to promote plant health, fruiting, growth, or used to slow plant growth for use by a cell.

In Example 17, the agricultural product as in any of Examples 1-16 comprises particles that fall within a range of 1 nanometer to 1000 nanometers.

In Example 18, the mineral substance as in any of Examples 1-13, 16 and 17 comprises both phyllosilicate and tectosilicate.

In Example 19, the method as in any of Examples 1-18 further comprises exchanging ions from the mineral substance with selected ions of a known source.

In Example 20, a concentration of mineral particles in solution as in any of Examples 1-19 is within a range of $1\times10^{-8}$ mg/ml to $1\times10^{4}$ mg/ml, and wherein a concentration of agricultural product ions or molecules ranges from 0.01 mg/ml to saturation point.

In Example 21, adding energy into the solution as in any of Examples 1-20 further comprises mixing the agricultural product, water and mineral substance using a vortex.

In Example 22, the mineral substance as in any of Examples 1-21 comprises a plurality of exchange sites where the known ions are exchanged with the native ions in the mineral substance.

In Example 23, the mineral substance as in any of Examples 1-23 comprises a plurality of channels, wherein a high pressure mixing action is used to at least partially fill the plurality of channels with the known ions and/or other agricultural products.

In Example 24, the liquid product as in any of Examples 1-24 is delivered to a plant cell and penetrates the plant cell, such that the known ions contained within the exchange sites of the mineral substance are released through diffusion and exchanged with the native ions within the plant cell, such that there is more efficient use of the known ions.

In Example 25, the mineral substance as in any of Examples 1-24 has a particle size range from 1 nanometer to 1000 nanometers.

In Example 26, the method as in any of Examples 1-25 further comprises bathing the effective amount of the mineral substance in a fertilizer and/or an agricultural product.

In Example 27, the method as in any of Examples 1-26 further comprises bathing the effective amount of the mineral substance in ultrapure water.

In Example 28, the method as in any of Examples 1-27 further comprises bathing the effective amount of the mineral substance in ultrapure water for at least 24 hours.

Example 29 is a method of producing a liquid product. In the method, the method may comprise providing an effective amount of ultrapure water to effectuate a response in a plant; providing an effective amount of an agricultural product sufficient to effectuate a response in the plant; providing an effective amount of a mineral substance having a high cation exchange capacity and comprising a plurality of particles of the mineral substance, wherein the mineral substance comprises synthetic nano size particles of mineral elements. The method of Example 29 may further comprise mixing the effective amount of ultrapure water, the effective amount of the agricultural product and the effective amount of the mineral substance together, thereby creating a solution of the water, the agricultural product and the mineral substance. Further, the method of Example 29 may comprise adding energy into the solution to produce a liquid product, wherein the liquid product exchanges native ions from the mineral substance with known ions from the agricultural product, such that the known ions are delivered and carried to a cell where the known ions are absorbed by the plant or are carried by the plurality of mineral particles directly into the cell.

Example 30 is synthetic agricultural product that comprises an effective amount of a fertilizer and/or other agricultural product sufficient to effectuate a desired result in a plant. The synthetic agricultural product of Example 30 may also comprise an effective amount of a synthetic mineral substance having a high cation exchange capacity, wherein the effective amount of the synthetic mineral substance comprises known ions that have been exchanged with native ions in a native mineral substance thereby creating a synthetic mineral substance. The synthetic agricultural product of Example 30 may further comprise an effective amount of water sufficient to effectuate a desired result in a plant and maintain the effective amount of the fertilizer and/or other agricultural products and the effective amount of the synthetic mineral substance in suspension and solution. The synthetic agricultural product of Example 30, wherein the effective amount of the fertilizer and/or other agricultural products and the effective amount of the synthetic mineral substance are added into the effective amount of water to thereby create the synthetic agricultural product.

In Example 31, the synthetic mineral substance of Example 30 comprises particles having a particle size within a range of about 1 nanometer to about 1000 nanometers.

In Example 32, the effective amount of water as in any of Examples 30-31 is ultrapure water.

In Example 33, the effective amount of water as in any of Examples 30-31 the effective amount of water is double distilled water.

In Example 34, the effective amount of water as in any of Examples 30-31 the effective amount of water is untreated water.

In Example 35, the effective amount of water as in any of Examples 30-31 the effective amount of water is potable water.

In Example 36, there are at least two orders of magnitude difference between the effective amount of the fertilizer and/or other agricultural products and the effective amount of the synthetic mineral substance as in any of Examples 30-35.

In Example 37, the synthetic mineral substance as in any of Examples 30-36 has a high cation exchange capacity and has an equivalents in a range of about 10 Milliequivalents/100 g to about 600 Milliequivalents/100 g.

In Example 38, the effective amount of the synthetic mineral substance as in any of Examples 30-37 is bathed in ultrapure water for at least 24 hours.

In Example 39, the effective amount of water as in any of Examples 30-38 falls within a range of about 0.1 gallon to about 6000 gallons. The synthetic agricultural product of claim 30, wherein the effective amount of the fertilizer and/or other agricultural products is a liquid fertilizer and/or other agricultural product.

In Example 40, the effective amount of liquid fertilizer and/or other agricultural products as in any of Examples 30-39 falls within a range of about 0.10 gallons to about 50 gallons.

In Example 41, the effective amount of the mineral substance as in any of Examples 30-40 falls within a range of about 5 grams to about 2 kilograms.

In Example 42, the synthetic mineral substance as in any of Examples 30-41 comprises alumina silicate, silicate, aluminum, sodium aluminosilicate or other tuff material.

In Example 43, the synthetic mineral substance as in any of Examples 30-42 comprises montmorillonite, illite, kaolinite, smectite and zeolite.

In Example 44, the synthetic mineral substance as in any of Examples 30-43 comprises smectite.

In Example 45, the synthetic mineral substance as in any of Examples 30-43 comprises zeolite.

In Example 46, the synthetic mineral substance as in any of Examples 30-45 is a carrier of nutrients and other small organic molecules used to protect plants, kill plants, or used as plant growth regulators to promote plant health, fruiting, growth, or used to slow plant growth for use by a cell.

In Example 47, the fertilizer and/or other agricultural product as in any of Examples 30-46 comprises particles that fall within a range of 1 nanometer to 1000 nanometers.

In Example 48, the synthetic mineral substance as in any of Examples 30-43 comprises both phyllosilicate and tectosilicate.

In Example 49, the agricultural product as in any of Examples 30-48 further comprises cations from a known source that have been exchanged with the cations of the synthetic mineral substance.

In Example 50, energy is added into the synthetic product as in any of Examples 30-49 by mixing the fertilizer and/or other agricultural product, water and synthetic mineral substance using a vortex.

In Example 51, the synthetic mineral substance as in any of Examples 30-50 comprises a plurality of exchange sites where the known ions are exchanged with the native ions of the native mineral substance.

In Example 52, the synthetic mineral substance as in any of Examples 30-51 comprises a plurality of channels, wherein the plurality of channels are at least partially filled with the known ions by a high pressure mixing action.

In Example 53, the synthetic agricultural product as in any of Examples 30-52 is delivered to a plant cell and penetrates the plant cell, such that the known ions contained within the exchange sites of the synthetic mineral substance are released through diffusion and exchanged with the native ions within the plant cell, such that there is more efficient use of the known ions.

In Example 54, the synthetic mineral substance as in any of Examples 30-53 has a particle size range from 1 nanometer to 1000 nanometers.

In Example 55, the synthetic mineral substance as in any of Examples 30-54 has been bathed in fertilizer and/or other agricultural product.

In the foregoing Detailed Description of the Disclosure, various features of the disclosure are grouped together in a single implementation or embodiment for the purpose of streamlining the disclosure. This method of disclosure is not to be interpreted as reflecting an intention that the claimed disclosure requires more features than are expressly recited in each claim. Rather, as the following embodiments reflect, inventive aspects lie in less than all features of a single foregoing disclosed embodiment. Thus, the following embodiments are hereby incorporated into this Detailed Description of the Disclosure by this reference, with each embodiment standing on its own as a separate embodiment of the disclosure.

It is to be understood that the above-described arrangements are only illustrative of the application of the principles of the disclosure. Numerous modifications and alternative arrangements may be devised by those skilled in the art without departing from the spirit and scope of the disclosure and the appended claims are intended to cover such modifications and arrangements. Thus, while the disclosure has been shown in the drawings and described above with particularity and detail, it will be apparent to those of ordinary skill in the art that numerous modifications, including, but not limited to, variations in size, materials, shape, form, ratios of elements or molecules, function and manner of operation, assembly and use may be made without departing from the principles and concepts set forth herein.

What is claimed is:

1. A synthetic agricultural product comprising:
   a fertilizer and/or other agricultural product comprising a number of known ions available to be exchanged, wherein the known ions do not include ammonium;
   a mineral substance comprising a number of native ion exchange sites; and
   an effective amount of water for maintaining the fertilizer and/or other agricultural product and the mineral substance in a suspension or solution;
   wherein at least one of the known ions available to be exchanged may attach to at least one of the native ion exchange sites; and
   wherein a volume of the fertilizer and/or other agricultural product and a volume of the mineral substance are such that the number of known ions available to be exchanged is at least two orders of magnitude greater than the number of native ion exchange sites.

2. The synthetic agricultural product of claim 1, wherein the mineral substance comprises particles having a particle size within a range of about 1 nanometer to about 1000 nanometers.

3. The synthetic agricultural product of claim 1, wherein the effective amount of water is ultrapure water.

4. The synthetic agricultural product of claim 1, wherein the effective amount of water is double distilled water.

5. The synthetic agricultural product of claim 1, wherein the effective amount of water is untreated water.

6. The synthetic agricultural product of claim 1, wherein the effective amount of water is potable water.

7. The synthetic agricultural product of claim 1, wherein the mineral substance has a high cation exchange capacity and has an equivalents in a range of about 10 Milliequivalents/100 g to about 600 Milliequivalents/100 g.

8. The synthetic agricultural product of claim 1, wherein the effective amount of the mineral substance is bathed in ultrapure water for at least 24 hours.

9. The synthetic agricultural product of claim 1, wherein the effective amount of water falls within a range of about 0.1 gallon to about 6000 gallons.

10. The synthetic agricultural product of claim 1, wherein the fertilizer and/or other agricultural product is a liquid fertilizer and/or other agricultural product.

11. The synthetic agricultural product of claim 10, wherein the liquid fertilizer and/or other agricultural product falls within a range of about 0.10 gallons to about 50 gallons.

12. The synthetic agricultural product of claim 11, wherein the mineral substance falls within a range of about 5 grams to about 2 kilograms.

13. The synthetic agricultural product of claim 1, wherein the mineral substance comprises alumina silicate, silicate, aluminum, sodium aluminosilicate or other tuff material.

14. The synthetic agricultural product of claim 1, wherein the mineral substance comprises montmorillonite, illite, kaolinite, smectite and zeolite.

15. The synthetic agricultural product of claim 1, wherein the mineral substance comprises smectite.

16. The synthetic agricultural product of claim 1, wherein the mineral substance comprises zeolite.

17. The synthetic agricultural product of claim 1, wherein the mineral substance is a carrier of nutrients and other small organic molecules used to protect plants, kill plants, or used as plant growth regulators to promote plant health, fruiting, growth, or used to slow plant growth for use by a cell.

18. The synthetic agricultural product of claim 1, wherein the fertilizer and/or other agricultural product comprises particles that fall within a range of 1 nanometer to 1000 nanometers.

19. The synthetic agricultural product of claim 1, wherein the mineral substance comprises both phyllosilicate and tectosilicate.

20. The synthetic agricultural product of claim 1, wherein the agricultural product further comprises cations from a known source that have been exchanged with the cations of the mineral substance.

21. The synthetic agricultural product of claim 1, wherein energy is added into the synthetic product by mixing the fertilizer and/or other agricultural product, water, and mineral substance using a vortex.

22. The synthetic agricultural product of claim 1, wherein the mineral substance comprises native ions having a high cation exchange capacity, and wherein the known ions of the fertilizer and/or other agricultural product are configured to be exchanged with the native ions of the mineral substance.

23. The synthetic agricultural product of claim 22, wherein the mineral substance comprises a plurality of channels, wherein the plurality of channels are at least partially filled with the known ions by a high pressure mixing action.

24. The synthetic agricultural product of claim 23, wherein the synthetic agricultural product is delivered to a plant cell and penetrates the plant cell, such that the known ions contained within the native ion exchange sites of the mineral substance are released through diffusion and exchanged with the native ions within the plant cell, such that there is more efficient use of the known ions of the fertilizer and/or other agricultural product.

25. The synthetic agricultural product of claim 1, wherein the mineral substance has been bathed in fertilizer and/or other agricultural product.

* * * * *